United States Patent Office 3,634,426
Patented Jan. 11, 1972

3,634,426
PYRIMIDO[1,2-a]INDOLES AND DIAZEPINO
[1,2-a]INDOLES
Marcel K. Eberle, Madison, N.J., assignor to
Sandoz-Wander, Inc., Hanover, N.J.
No Drawing. Filed Oct. 13, 1969, Ser. No. 865,973
Int. Cl. C07d 51/46
U.S. Cl. 260—251
18 Claims

ABSTRACT OF THE DISCLOSURE

The invention discloses pharmacologically active compounds which are fused ring indole derivatives from the general classes of pyrimido[1,2-a]indoles, diazepino-[1,2-a]indoles, spiro[pyrimido[1,2-a]indoles] and spiro-[diazepino[1,2-a]indoles-1, and the preparation thereof involving reaction of 1-phenylpyrazolidine or 1-phenylhexahydropyridazine with an acyclic or cyclic aldehyde. The compounds are active on the central nervous system and are useful as stimulants in the case of the spiro compounds and as sedatives and/or tranquilizers in the case of the non-spiro compounds. The compounds, which may be substituted or unsubstituted, are represented by 10,10-dimethyl - 1,2,3,4,10,10a-hexahydropyrimido[1,2-a]indole hydrochloride and spiro[cyclohexane-1,10'-1',2',3',4',10', 10a'-hexahydropyrimido[1,3-a]indole hydrochloride.

---

The present invention relates to novel compounds which generally are fused ring indole derivatives, and to novel procedures for their preparation. The invention also relates to pharmaceutical methods and compositions based on said compounds.

The compounds of the present invention may be represented by the general Formula I involving compounds of the Formulae I–A and I–B, as follows:

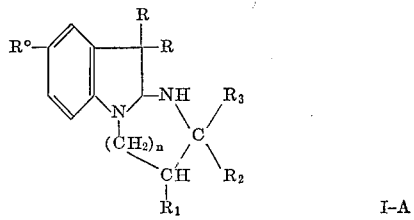

and

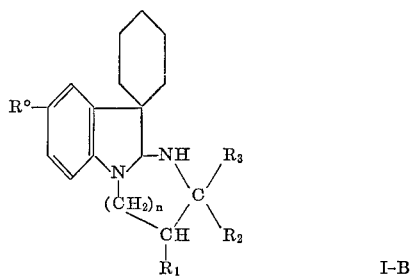

in which
R° is hydrogen, halo of atomic weight of from 19 to 36, lower alkyl of 1 to 3 carbon atoms or lower alkoxy of 1 to 3 carbon atoms, R is independently lower alkyl of 1 to 3 carbon atoms,
$n$ is 1 or 2, and
each of $R_1$, $R_2$ and $R_3$ is independently hydrogen or methyl provided no more than one of $R_1$ and $R_2$ is other than hydrogen and further provided that $R_1$ and $R_3$ are hydrogen when $n$ is 2.

The compounds having the general Formula I may be prepared by a general Process A involving reacting a compound having a general Formula II and selected from the group of a compound of Formula II–A and Formula II–B, as follows:

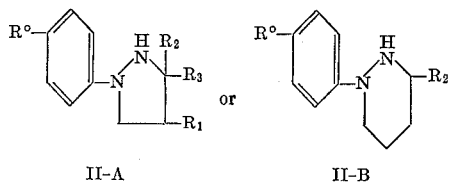

II–A          II–B in which $R_0$, $R_1$, $R_2$ and $R_3$ are as above defined, with a compound having the general Formula III and selected from the group of a compound of Formula III–A and Formula III–B, as follows:

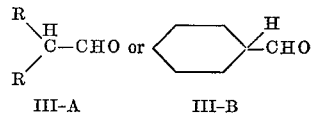

III–A          III–B in which R is as defined, whereby the reaction with a compound III–A provides the compounds of Formula 1–A and the reaction employing a compound III–B provides the compounds of Formula B.

The preparation of compounds I by Process A involving reaction of a compound II with a compound III–A or III–B to form compounds I–A and I–B, respectively, is conveniently carried out at elevated temperatures in the range of from 50° C. to 150° C., preferably 75° C. to 120° C. The reaction is desirably carried out in the presence of an inert organic solvent which may be any of several conventional organic solvents. The more preferred solvents are the aromatic solvents such as benzene and toluene, preferably toluene. The molar ratio of compound III to compound II is not particularly critical and satisfactory results may be obtained at a molar ratio in the range of 0.8:1 to 2:1. It is generally preferred to employ a slight excess of the compound III and the usually preferred molar ratio is in the range of 1.05:1 to 1.4:1. The time for the reaction may vary fairly widely depending upon several factors including the particular compound being prepared. Satisfactory results are usually obtained when the reaction time is in the range of 20 minutes to 10 hours, more usually 30 minutes to 7 hours. Excessive reaction time offers no particular advantage and may result in undesired decomposition of the desired product. The reaction product of Formula I may be isolated from the reaction mixture of Process A by working up by conventional procedures.

It is not desired to be committed as a part of this invention to any theory by which Process A operates to produce compounds of Formula I. It is believed, however, that such process proceeds according to a scheme which is illustrated below for the preparation of a compound of Formula I-A, as follows:

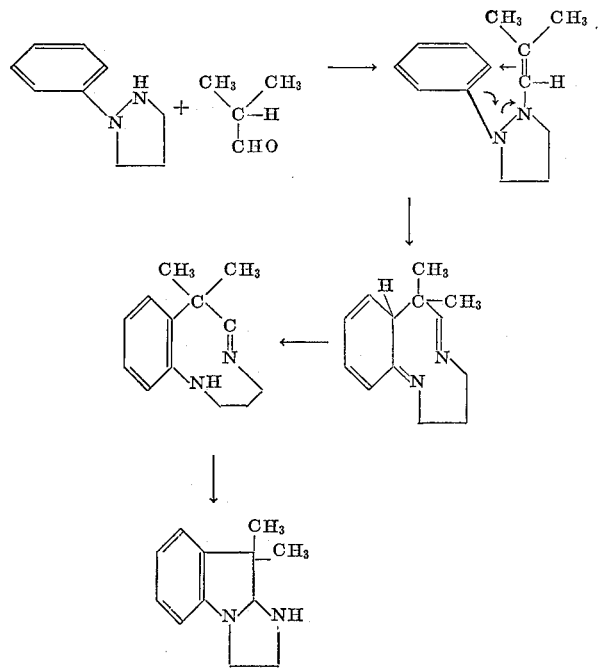

Certain of the compounds of Formula II employed as starting material in the process of the invention are either known or may be prepared by established procedures from known materials. Many such compounds as well as others of the formula II are preferably prepared by a process referred to herein as the "Reduction Process" and involving generally in its various embodiments the reduction of a corresponding or related unsaturated compound bearing a carbonyl function and identified herein as having the general Formula IV. One preferred embodiment of such reduction process is referred to herein as process RP-A-1 and may be illustrated as follows:

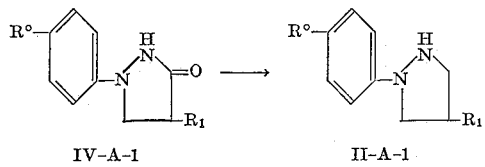

A second preferred embodiment of the reduction process is process RP-A-2, as follows:

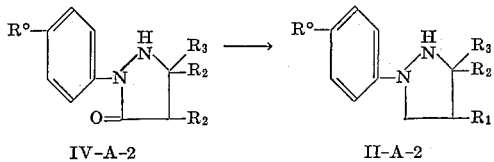

A further preferred embodiment of the reduction process is process RP-B-1, as follows:

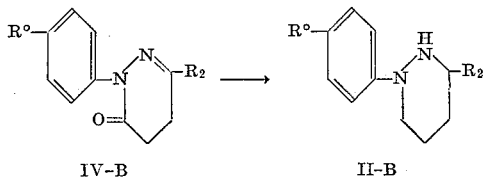

The Reduction Process in general may be suitably carried out with lithium aluminum hydride as reducing agent at temperatures in the range of 20° C. to 120° C., preferably 30° C. to 70° C. Such reduction is carried out in an organic solvent inert under the reaction conditions. Any of several of the well-known organic solvents may be employed for the purpose. The preferred solvents include the acyclic and cyclic ethers such as diethyl ether, tetrahydrofuran and dioxane, especially tetrahydrofuran. It is also possible to carry out the Reduction Process employing an alkali metal such as sodium in the presence of a source of hydrogen such as lower alcohol, e.g., ethanol, but such known reduction procedures are less preferred for production of compounds II. The product compounds II may be isolated from the Reduction Process by working up by conventional procedures. The compounds II are conveniently obtained in the reduction process in the form of an acid addition salt and may be readily converted by established procedures to the corresponding free base which is the more desired form for use in Process A.

Reduction Process RP-B-1 directed to the production of six-membered ring compounds II-B is of interest as are processes RP-A-1 and RP-A-2 as it was found that the correspondingly unsaturated five-membered ring compound of Formula IV-A-2 ($R_2$ and $R_3$ being hydrogen) could not be effectively reduced to provide the corresponding compounds of Formula II-A-2. Novel compounds produced by the Reduction Process include those of Formula II-B.

The compounds of Formula IV employed in the Reduction Process and also the compounds III are either known or may be obtained from known materials by established procedures.

The compounds of general Formula I form acid addition salts and the pharmaceutically acceptable acid addition salts thereof are included within the scope of the said pharmaceutically useful compounds provided by this invention. Such acid addition salts include, by way of example only, the hydrochloride, hydrobromide, maleate and the like. In general, the acid addition salts may be produced from the free bases by conventional techniques and, conversely, the free bases may be obtained from the acid addition salts by known procedures.

The compounds of general Formula I are useful because they possess pharmacological activity in animals. In general, the compounds of Formula I are active on the Central Nervous System as indicated by behavior tests in mice which together with one or more animal tests indicated that the compounds are useful, for example, as stimulants or sedatives and/or tranquilizers. More particularly, the compounds of Formula I-A generally show patterns of mixed central nervous system activity in the behavior tests and are indicated for use as sedatives and/or tranquilizers by the behavior test and one or more additional animal tests, for example, by a reinduction of hexobarbital anesthesia in mice and by the Rotarod muscle relaxant test in mice. The compounds of Formula I-B also generally show patterns of mixed central nervous system activity in the behavior test and are indicated for use as stimulants by the behavior test and one or more additional animal tests, for example, by the potentiation of amphetamine in mice.

Compounds of Formula I may be also useful to obtain other beneficial pharmacological effects in animals. For example, the compounds of the type of those of Formula I-B as represented by the compound of Example 2 herein are useful as diuretics as indicated on oral administration to unanesthetized rats. Said compounds as represented by the compounds of Example 2 are also useful as hypotensive agents as indicated by a lowering of blood pressure in the anesthetized dog.

For all the above uses the compounds may be combined with a pharmaceutically acceptable carrier, and such other conventional adjuvants as may be desirable, and administered orally in such forms as tablets, capsules, elixirs, suspensions and the like, or parenterally in the form of an injectable solution or suspension. The dosage administered will of course vary depending upon known factors such as the compound used and mode of administration. However, in general, satisfactory results are obtained when administered at a daily dosage of from about 1 milligram to about 200 milligrams per kilogram of body weight, preferably given in divided doses 2 to 4 times a day, or in sustained release form. For most mammals the administration of from about 50 milligrams to about 1000 milligrams of the compound per day provides satisfactory results and dosage forms suitable for internal administration comprise from about 15 milligrams to about 500 milligrams of the compound in admixture with a solid or liquid pharmaceutical carrier or diluent.

For the above mentioned pharmaceutical uses, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional-excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
| --- | --- |
| Spiro[cyclohexane - 1,10' - 1',2',3',4',10',10a'-pyrimido[1,2-a]indole] hydrochloride | 25–50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE A 1-phenylpyrazolidine

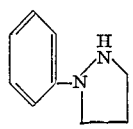

A solution of 50 g. of 1-phenylpyrazolone-3 in 500 ml. of dry tetrahydrofuran is added dropwise to a mixture of 15 g. of lithium aluminum hydride (LAH) in 150 ml. of tetrahydrofuran. The resulting mixture is heated at reflux overnight, cooled, mixed with 500 ml. of diethyl ether and excess LAH destroyed by slow addition of 70 ml. of water. The resulting mixture is filtered and the resulting solid material washed with 300 ml. of diethyl ether and the resulting ether wash and filtrate evaporated in vacuo to dryness to obtain an oil of 1-phenylpyrazolidine which may be readily converted to he hydrochloride salt, M.P. 167–168° C., and the maleate salt, M.P. 112–113° C.

EXAMPLE B 4-methyl-1-phenylpyrazolidine

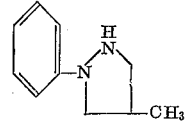

Following the procedure of Example A and employing the appropriate corresponding starting materials in approximately similar proportions there is obtained 4-methyl-1-phenylpyrazolidine hydrochloride, M.P. 202–204° C.

EXAMPLE C 3-methyl-1-phenyl-hexahydropyridazine

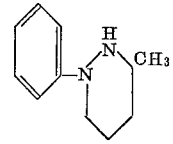

Following the procedure of Example A the compound 3 - methyl-1-phenyl-4,5-dihydropyridazine-6(1H)-one is reacted with LAH in approximately similar proportions to obtain 3-methyl-1-phenylhexahydropyridazine hydrochloride, M.P. 202–204° C.

EXAMPLE 1

10,10-dimethyl-1,2,3,4,10,10a-hexahydropyrimido-[1,2-a]indole hydrochloride

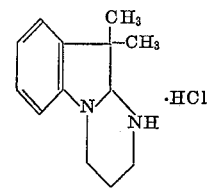

A solution of 5 g. of 1-phenyl-pyrazolidine and 5 g. of isobutyraldehyde in 50 ml. of toluene is refluxed for 5 hours while separating water in a Dean-Stark tube. The resulting solution is cooled and treated with dry hydrogen chloride to obtain a solid material which is recrystallized from methanol/diethyl ether to obtain 10,10-dimethyl-1,2,3,4,10,10a - hexahydropyrimido[1,2 - a]indole hydrochloride, M.P. 216–218° C.

EXAMPLE 2

Spiro[cyclohexane-1,10'-1',2',3',4',10a'-hexahydropyrimido[1,2-a]indole]hydrochloride

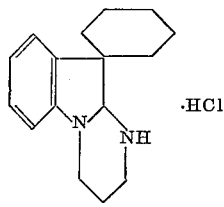

A solution of 8.5 g. of 1-phenyl-pyrazolidine and 7.0 g. of cyclohexanecarboxaldehyde in 50 ml. of toluene is refluxed for 2 hours while separating water in a Dean-Stark tube. The resulting solution is cooled and treated with dry hydrogen chloride to obtain spiro[cyclohexane-1,10'-1',2',3',4',10',10a' - hexahydropyrimido[1,2 - a] indole] hydrochloride, M.P. 217–218° C.

What is claimed is:
1. A compound from the group of:

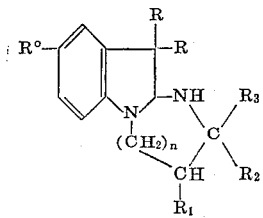

and

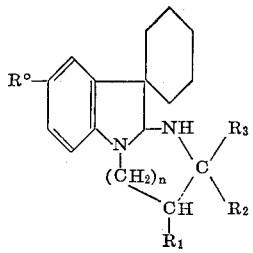

in which

R° is hydrogen, halo of atomic weight of from 19 to 36, lower alkyl of 1 to 3 carbon atoms or lower alkoxy of 1 to 3 carbon atoms,
R is independently lower alkyl of 1 to 3 carbon atoms,
$n$ is 1 or 2, and
each of $R_1$, $R_2$ and $R_3$ is independently hydrogen or methyl provided no more than one of $R_1$ and $R_2$ is other than hydrogen and further provided that $R_1$ and $R_3$ are hydrogen when $n$ is 2, or a pharmaceutically acceptable acid addition salt thereof.

2. A compound of claim 1 having the formula:

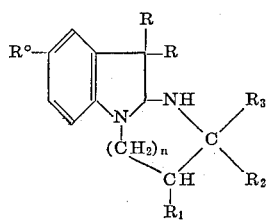

in which R°, R, $R_1$, $R_2$, $R_3$ and $n$ are as defined in claim 1.
3. A compound of claim 2 in which $n$ is 1.
4. A compound of claim 3 in which R°, $R_1$, $R_2$ and $R_3$ are hydrogen.
5. The compound of claim 4 in which R is methyl.
6. A compound of claim 1 having the formula:

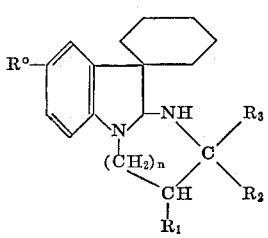

in which R°, R, $R_1$, $R_2$, $R_3$ and $n$ are as defined in claim 1.
7. A compound of claim 6 in which $n$ is 1.

8. The compound of claim 7 in which R°, $R_1$, $R_2$ and $R_3$ are hydrogen.
9. The process for preparing a compound of claim 2 comprising reacting a compound from the group of:

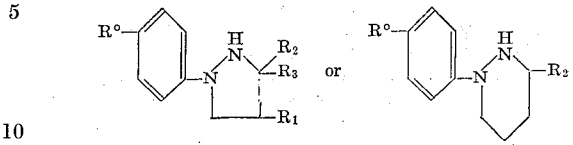

in which R°, $R_1$, $R_2$ and $R_3$ are the same as in claim 2, with a compound of the formula:

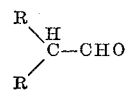

in which R is the same as in claim 2, at an elevated temperature in the range of from 50° C. to 150° C.
10. The process of claim 9 in which the reaction is carried out in an inert organic solvent.
11. The process of claim 10 in which the temperature is in the range of 75° C. to 120° C.
12. The process of claim 11 in which the molar ratio of the aldehyde to the cyclic compound is in the range of from 1.05:1 to 1.4:1.
13. The process of claim 12 in which R°, $R_1$, $R_2$ and $R_3$ are hydrogen.
14. The process for preparing a compound of claim 6 comprising reacting a compound from the group of:

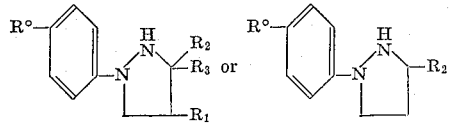

in which R°, $R_1$, $R_2$ and $R_3$ are the same as in claim 6, with the compound of the formula:

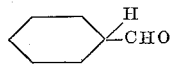

at an elevated temperature in the range of from 50° C. to 150° C.
15. The process of claim 14 which is carried out in an inert organic solvent.
16. The process of claim 15 in which the temperature is in the range of 75° C. to 120° C.
17. The process of claim 16 in which the ratio of aldehyde to heterocyclic compound is in the range of from 1.05:1 to 1.4:1.
18. The process of claim 17 in which R°, $R_1$, $R_2$ and $R_3$ are hydrogen.

References Cited
UNITED STATES PATENTS

| | | | |
|---|---|---|---|
| 2,984,665 | 5/1961 | Bortnick et al. | 260—251 |
| 2,984,666 | 5/1961 | Bortnick et al. | 260—251 |
| 2,993,046 | 7/1961 | Bortnick et al. | 260—251 |
| 2,993,047 | 7/1961 | Bortnick et al. | 260—251 |

ALEX MAZEL, Primary Examiner
R. V. RUSH, Assistant Examiner

U.S. Cl. X.R.
260—250 A, 310 D, 326.9; 424—251, 274